United States Patent [19]
Dubeck et al.

[11] 3,859,411
[45] Jan. 7, 1975

[54] RECOVERY OF METAL VALUES FROM SULFIDE ORES USING NITROGEN DIOXIDE AS A ROAST GAS

[75] Inventors: Michael Dubeck, Birmingham; Duane C. Hargis, Southfield, both of Mich.

[73] Assignee: Ethyl Corporation, Richmond, Va.

[22] Filed: Aug. 28, 1972

[21] Appl. No.: 284,350

[52] U.S. Cl............... 423/45, 423/49, 423/98, 423/109, 423/150, 423/154, 75/116, 423/53
[51] Int. Cl............... C22b 1/06, C22b 3/00
[58] Field of Search......... 423/45, 27, 53, 109, 138, 423/150, 405, 154; 204/119; 75/116, 117, 118, 119, 120, 121

[56] References Cited
UNITED STATES PATENTS

| | | |
|---|---|---|
| 401,056 | 4/1889 | Perino.................................. 75/116 |
| 653,414 | 7/1900 | Fink..................................... 75/117 |
| 692,008 | 1/1902 | Frolich et al. ...................... 423/45 |
| 1,159,032 | 11/1915 | Hovland et al. .................... 423/405 |
| 59,693 | 11/1866 | Whelpley et al..................... 75/116 |
| 2,773,743 | 12/1956 | Fackert............................... 423/154 |

FOREIGN PATENTS OR APPLICATIONS

| | | | |
|---|---|---|---|
| 1,084 | 3/1878 | Great Britain...................... | 423/523 |

Primary Examiner—Oscar R. Vertiz
Assistant Examiner—Brian E. Hearn
Attorney, Agent, or Firm—Donald L. Johnson; Robert A. Linn

[57] ABSTRACT

A roast/leach process for recovering metal values from sulfide metal mineral ores or concentrates. The roast step features treating the sulfide mineral at elevated temperatures with a nitrogen dioxide containing gas.

20 Claims, 1 Drawing Figure

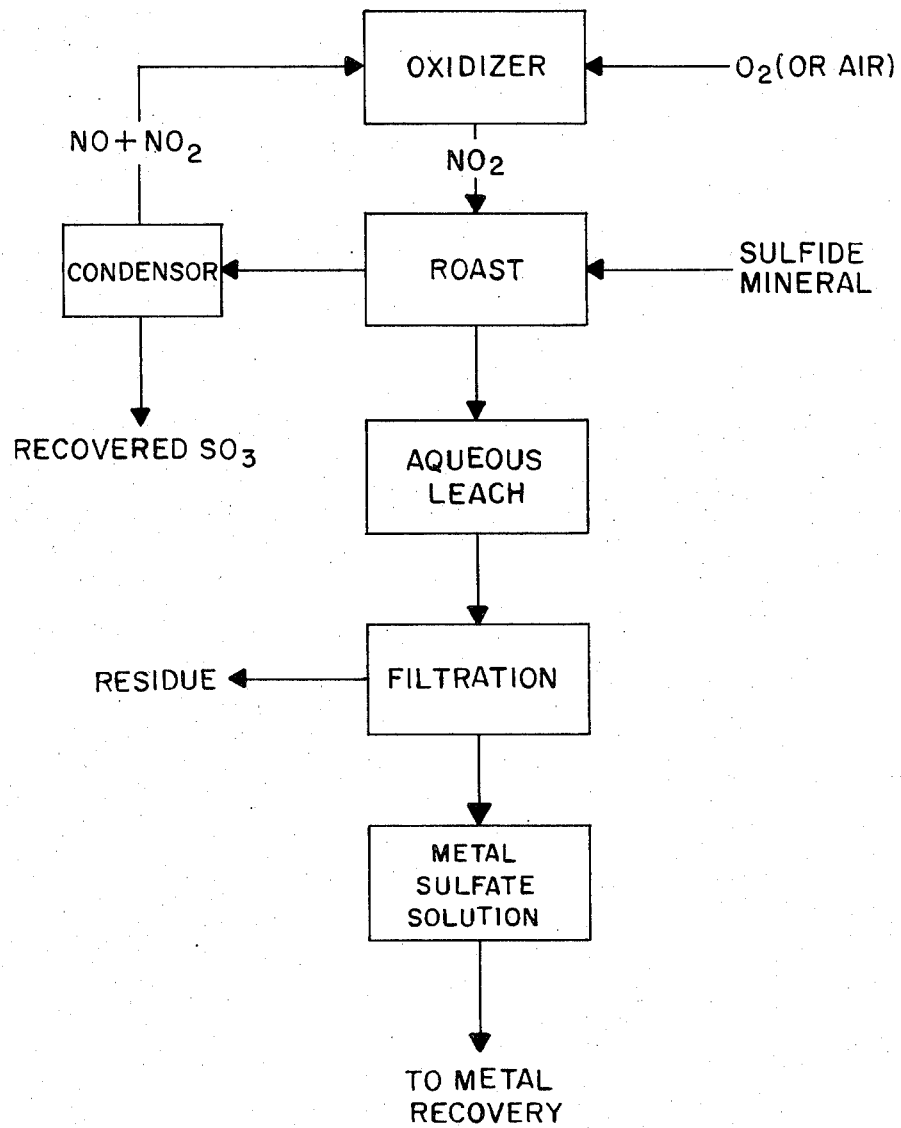

RECOVERY OF METAL VALUES FROM SULFIDE ORES USING NITROGEN DIOXIDE AS A ROAST GAS

BACKGROUND OF THE INVENTION

The present invention involves the recovery of metals from sulfide minerals by a roast/leach process. The process is especially useful for recovering copper from chalcopyrite ores and concentrates.

Roast/leach processes for recovering metals from metal sulfide minerals, ores, or concentrates are known. The roast step in such a process involves treating the particular mineral with an oxidant at elevated temperatures. The treated concentrate is then leached with water or a dilute mineral acid solution, extracting the particular metal or metals as metal sulfate. Two such processes are described in the art. In one process, the oxidant used is either air or oxygen. This process is described in "Copper," Chapter 4, Allison Burts, (1970). A second roast/leach process is described in West German Pat. No. 2,102,576, to the Anaconda Company. This process utilizes anhydrous sulfur trioxide or mixtures of sulfur trioxide and oxygen as the oxidant in the roast step.

In the present process, the roasting step is carried out in the presence of nitrogen dioxide containing gas. The nitrogen dioxide effects a more efficient conversion of the metal in the sulfide mineral to metal sulfate which is readily leached; where iron and copper are both present in the mineral, by proper selection of roast conditions, copper can be selectively converted to sulfate; and roast exhaust gas pollution control is facilitated because $NO_2$ can convert effluent $SO_2$ to $SO_3$, a more readily trapped gas.

DESCRIPTION OF THE DRAWINGS

FIGURE is a system flow sheet embodying the present process.

SUMMARY OF THE INVENTION

A process for recovering metal from sulfide metal mineral by (1) treating said mineral with a nitrogen dioxide containing gas at elevated temperatures and (2) leaching the treated mineral with an aqueous medium whereby a substantial amount of the metal contained in the mineral is recovered as metal sulfate solution.

DESCRIPTION OF THE PREFERRED EMBODIMENTS

An embodiment of the present invention is a process for recovering metal from sulfide metal mineral which comprises treating said mineral at elevated temperatures with a nitrogen dioxide containing gas, leaching the treated mineral with an aqueous medium, separating the liquid from the solid in the leaching step, thereby obtaining a solution containing a substantial amount of the metal contained in said mineral as metal sulfate. This separation can be carried out using any suitable procedure, for example, by filtration, by centrifugation, by decantation, and the like.

In a preferred embodiment of the present invention, the treating gas is nitrogen dioxide, and the sulfide metal mineral is a concentrate. The present process is especially preferred for recovering copper from sulfide copper minerals or concentrates and especially such concentrates which are rich in chalcopyrite ($CuFeS_2$).

The present process can be utilized to recover various metals from sulfide minerals and mixtures containing sulfide minerals. Metals which are included in this group are iron, nickel, zinc, lead molybdenum, copper, cobalt, silver and manganese. Examples of minerals which can be subjected to the present process are pyrite ($FeS_2$), sphalerite (ZnS), molybdenite ($MoS_2$), galena (PbS), nickel sulfide ($Ni_3S_2$), and the like; useful minerals can also contain non-sulfide minerals such as zincite (ZnO), smithsonite ($ZnCO_3$), wulfenite ($PbMoO_4$), molybdenite ($Fe_2O_3 \cdot 3MoO_3 \cdot 7H_2O$), cerussite ($PbCO_3$), calamine ($Zn[OH]_2SiO_3$), tenorite (CuO), chrysocolla ($CuSiO_3 \cdot 2H_2O$), azurite [$Cu_3(CO_3)_2$], cuprite (CuO), malachite [$Cu_2CO_3(OH)_2$], and the like. Minerals to which the present process are especially applicable are sulfide copper minerals. Examples of sulfide copper minerals are covellite (CuS), chalcocite ($Cu_2S$), bornite ($Cu_5FeS_4$), tetrahedrite, tennantite, chalcopyrite ($CuFeS_2$), and the like. These preferred copper minerals can also contain or be in admixture with copper oxide minerals as well as minerals of the other above-listed metals.

These metal minerals occur naturally and are mined as metal ores. These metal ores are generally mixtures containing the sulfide metal minerals, non-sulfide metal minerals, and other non-metal materials. Although this ore itself can be subjected to the present process, it is preferred that a so-called "concentrate" be used. This concentrate is the product obtained when the sulfide metal mineral is separated from a substantial amount of the non-metal materials and the non-sulfide metal minerals. This concentrate is rich in the particular sulfide metal mineral or minerals found in the ore. The methods for concentrating metal ores are well-known to those skilled in the art.

A particularly useful concentrate is that obtained from sulfide metal ore where the predominant mineral is a sulfide copper mineral. An especially preferred concentrate is one which contains a substantial amount (80% or more) of the sulfide copper mineral chalcopyrite.

An example of a useful concentrate containing minerals in addition to sulfide copper is an ore concentrate (Concentrate B), having the following composition.

Concentrate B Composition

A. Principal Minerals
   Cubanite — $Cu_2S \cdot Fe_4S_5$
   Chalcopyrite — $CuFeS_2$
   Pentlandite — $(Ni,Fe)_9S_8$
   Pyrite — $FeS_2$
   Pyrrhotite — $Fe_{x-1}S_x$ B. Typical Cu and Ni Content
   Cu — to about 12%
   Ni — to about 5%

C. Average Assay, One Sample
   Cu = 12.5%
   Ni = 2.68%
   Fe = 32.8%
   Insolubles = 22.6%
   S = 24.4%
   Co = 0.14%
   C = 0.81%

As the assay shows, the concentrate also contains a minor amount of a cobalt mineral. The assay values and typical Cu and Ni content are illustrative and not meant to be limiting. The valuable metals in this concentrate are copper, nickel, and cobalt.

The present process is applicable to sulfide metal minerals, their ores, or concentrates as solids in various degrees of subdivision. However, it is preferred that the mineral ore or concentrate be ground to a fineness of about 50 mesh and preferably 100 mesh and smaller. Ordinarily, the mineral or mineral concentrate will be substantially free of moisture although wet concentrates are also useful.

The first step in the present process is a roasting step. In the roasting step, the mineral or mineral concentrate is treated with a nitrogen dioxide containing gas at elevated temperatures. The metal in said mineral or concentrate is thereby converted to its sulfate. This treatment or roasting step is also commonly referred to as a sulfating or sulfatizing roast.

The nitrogen dioxide containing gas encompasses gases containing about 1% or more of nitrogen dioxide. The other gaseous components can be gases such as nitrogen, oxygen, sulfur dioxide, sulfur trioxide, water vapor, other oxides of nitrogen, ozone, and mixtures of such gases. Preferred nitrogen dioxide containing gases are mixtures of $NO_2$ and other oxidizing gases, such as $SO_2$, $O_2$, $SO_3$, NO, ozone, air and their mixtures. In these preferred mixtures, the nitrogen dioxide content can range from about 1% to about 99% by volume, with the preferred range being from about 20% to about 95% by volume; the more preferred range being from 50% to about 90% by volume $NO_2$.

Examples of preferred $NO_2$ containing gases are the following mixtures (% by weight). 90% $NO_2$, 10% $SO_2$; 60% $NO_2$, 30% $O_2$, 10% $SO_3$; 1% $NO_2$, 99% $O_2$; 5% $NO_2$, 95% $SO_2$; 20% $NO_2$, 80% air; 50% $NO_2$, 50% $SO_3$; 40% $NO_2$, 55% $SO_2$, 5% $SO_3$; 70% $NO_2$, 10% $SO_3$, 10% $SO_2$, 10% $O_2$; 80% $NO_2$, 15% NO, 5% $O_2$; 99% $NO_2$, 1% air; 30% $NO_2$, 40% $SO_3$, 30% air; 45% $NO_2$, 55% $O_2$; 50% $NO_2$, 48% $O_2$, 2% $O_3$; 85% $NO_2$, 10% NO, 3% air, 2% $SO_2$; 90% $NO_2$, 10% $SO_2$; 70% $NO_2$, 30% $SO_2$; 99% $NO_2$, 1% $O_2$; 99% $NO_2$, 1% air; 1% $NO_2$, 99% air, and the like.

Another preferred nitrogen dioxide containing gas is nitrogen dioxide itself. An example of such a gas is commercial grade nitrogen dioxide.

The treatment with nitrogen dioxide containing gas is carried out at elevated temperatures. Temperatures as low as about 350°C. can be used. Ordinarily, a treatment temperature ranging from about 400°C. to about 750°C. can be used. Treatment temperatures ranging from about 400°C. to about 700°C. are preferred. More preferred treatment temperatures range from about 400°C. to about 650°C., with the most preferred range being about 500°C. to about 650°C.

The treatment with nitrogen dioxide containing gas at elevated temperatures is carried out for a time sufficient to convert a substantial amount of the metal in the mineral to the metal sulfate. The time required, therefore, will vary depending on the particular mineral being treated, its state of subdivision, the nitrogen dioxide content of the treatment gas, the feed rate of treatment gas, the type of treatment apparatus utilized, the treatment temperature, and the like.

This treatment is generally carried out at atmospheric pressure although pressures above atmospheric can be used if desired.

After the concentrate is treated with nitrogen dioxide containing gas, it is subjected to an aqueous medium leach. This leach involves treating the roasted mineral or concentrate with water or preferably a dilute aqueous mineral acid solution, for example, dilute sulfuric acid, dilute hydrochloric acid, and the like. By dilute we mean solutions containing 1%–30% and preferably 5%–15% by weight of acid. The aqueous medium extracts the soluble metal sulfates from the roasted mineral or concentrate. The solution containing the metal sulfate is then separated from the undissolved residue by conventional means, such as by filtration, by centrifugation, by decantation, and the like. The metal from the metal sulfate solution thus obtained is recovered by available methods such as chemical reduction, electrolysis, hydrorefining, and the like.

The roast/leach process of the present invention is especially useful for recovering copper from sulfide copper minerals or concentrates; and especially where the concentrate contains a substantial amount of chalcopyrite.

The following general procedure was utilized to illustrate the present process for recovering metals from a sulfide mineral, its ore or concentrate.

General Procedure

A. $NO_2$ Treatment (Roast)

The reaction vessel used was a round botton, quartz flask having a crease on one side. The flask was inserted in a tube furnace so that all but 3 inches of the neck of the reaction vessel was inside the furnace. The vessel was fitted with gas inlet and outlet tubes; and a thermocouple was inserted in the heated portion of the inlet tube to record the treatment or reaction temperature.

The sulfide mineral (as concentrate), was then charged to the flask. The flask was then rotated and flushed with nitrogen while it was heated to the desired reaction temperature. When the desired reaction temperature was reached, the nitrogen flow was discontinued and nitrogen dioxide containing gas was conducted in stages at varying reaction temperatures. The treatment with nitrogen dioxide containing gas was continued for a certain period of time. At the end of this time, the nitrogen dioxide containing gas flow was discontinued, the heating was discontinued, and the vessel was flushed with nitrogen until it cooled to about room temperature.

B. Aqueous Medium Leach

A portion (2 grams) of the treated concentrate from A was placed in a suitable vessel and leached as follows:

(1) agitate with 25 milliliter portion of pH 2.1 sulfuric acid solution for 30 minutes, at 50°C., (2) filter — save filtrate, (3) treat residue from (2) with second 25 milliliter portion of pH 2.1 sulfuric acid solution for 30 minutes, at 50°C., (4) filter; combine filtrate with filtrate from (2) and analyze for metal, (5) treat residue from (4) with 50 milliliters of 10% (by weight) sulfuric acid solution for 30 minutes, (6) filter; analyze filtrate for metal.

The copper, iron and other metals present in the filtrate from (4) and (6) were recorded as percent copper or other metal based on total copper or other metal present in the original sulfide mineral charged. Total metal recovered is the sum of metal found in (4) and (6) filtrates.

The following tables contain data from a series of runs made using the above general procedure.

TABLE I

METAL RECOVERY FROM CHALCOPYRITE CONCENTRATE

| Ex. Run | Roast Gas | Roast Temp. (°C.) | Roast Time (Hrs) | % Cu Recovered | | | % Fe Recovered | | |
|---|---|---|---|---|---|---|---|---|---|
| | | | | pH 2.1 Solution Leach | 10% $H_2SO_4$ Leach | Total Cu | pH 2.1 Solution Leach | 10% $H_2SO_4$ Leach | Total Fe |
| 1 | $NO_2$ | 475 | 2 | 69.2 | 11.2 | 80.4 | 26.7 | 20.1 | 46.8 |
| 2 | $NO_2$ | 500 | 2.5 | 69.2 | 21.4 | 90.6 | 10.3 | 19.5 | 29.8 |
| 3 | $NO_2$ | 550 | 2 | 50.0 | 46.7 | 96.7 | 1.3 | 10.7 | 12.0 |
| 4 | $NO_2$ | 600 | 2.5 | 37.7 | 50.4 | 88.1 | 0.2 | 8.2 | 8.4 |
| 5 | $NO_2$ | 650 | 2 | 41.6 | 49.2 | 90.8 | 0.0 | 5.7 | 5.7 |
| 6 | $NO_2$ | 500 | 4 | 65.8 | 28.1 | 93.9 | 8.4 | 14.3 | 22.7 |
| 7 | $NO_2$ | 500 | 1 | 93.8 | 3.8 | 97.6 | 13.9 | 13.7 | 27.6 |
| 8 | $NO_2$ | 500 | 1 | 75.5 | 6.1 | 81.6 | 26.3 | 13.5 | 39.8 |
| 9 | $NO_2$ | 600(3) | 3.5 | 82.3 | 14.6 | 96.9 | 5.9 | 12.2 | 18.1 |
| 10 | $NO_2$ | 600 | 2.5 | 62.2 | 24.5 | 86.7 | 0.2 | 9.9 | 10.1 |
| 11 | $NO_2$ | 600 | 4 | 86.7 | 4.4 | 91.1 | 3.5 | 1.8 | 5.3 |
| 12 | $NO_2$ | 550 | 4 | 93.5 | 2.0 | 95.5 | 6.0 | 5.3 | 11.3 |
| 13 | $NO_2$ | 700 | 4 | 42.7 | 24.9 | 67.6 | 0.0 | 1.8 | 1.8 |
| 14 | $NO_2$ | 400 | 7 | 66.5 | 4.0 | 70.5 | 53.9 | 12.2 | 66.1 |
| 15 (1) | $NO_2$ | 600 | 3 3 | 57.6 | 25.4 | 83.0 | 0.0 | 4.9 | 4.9 |
| 16 | 90% $NO_2$/10% $SO_2$(2) | 500 | 3 | 86.5 | 5.0 | 91.5 | 1.0 | 32.1 | 33.1 |
| 17 | 90% $NO_2$/ 10% $O_2$ | 600 | 3 | 89.1 | 2.5 | 91.6 | 1.0 | 2.5 | 3.5 |
| 18 | 50% $NO_2$/ 50% $O_2$ | 600 | 2 | 90.4 | 4.4 | 94.8 | 2.0 | 3.1 | 5.1 |
| 19 | 10% $NO_2$/ 90% $O_2$ | 600 | 3 | 97.8 | 1.4 | 99.2 | 5.4 | 1.5 | 6.9 |
| 20 | 90% $NO_2$/ 10% air | 600 | 3 | 73.7 | 15.9 | 89.6 | 0.3 | 2.7 | 3.0 |
| 21 | 50% $NO_2$/ 50% air | 600 | 3 | 64.1 | 24.3 | 88.4 | 0.0 | 5.7 | 5.7 |
| 22 | 10% $NO_2$/ 90% air | 600 | 3 | 93.0 | 3.3 | 96.3 | 2.2 | 2.2 | 4.4 |

[1] The concentrate charge was pretreated with nitrogen gas at 70 cc/min. at 700° C. for one hour.
[2] Percent is by volume.
[3] For this run, the $NO_2$ roast was staged. First stage—$NO_2$ treatment at 500° C. for about 120 minutes. Second stage—heat to 600° C. continuing $NO_2$ treatment for about 80 minutes (including time to heat to 600° C.).

TABLE II

METAL RECOVERY FROM CONCENTRATE "B"

| Ex. Run | Roast Gas | Roast Temperature | Roast Time | Metals Recovered[1] | | | |
|---|---|---|---|---|---|---|---|
| | | | | Total % Cu | Total % Fe | Total % Ni | Total % Cu |
| A | $NO_2$ | 600°C. | 2.5 | 82.7 | 3.0 | 69.8 | 33.4 |
| B | $NO_2$ | 700°C. | 2.5 | 41.0 | 0.7 | 29.7 | 17.4 |
| C | $NO_2$ + 30% $SO_2$(2) | 600°C. | 2.5 | 94.9 | 11.7 | 82.3 | 42.4 |
| D | $NO_2$ + 30% $SO_2$(2) | 700°C. | 1.5 | 88.0 | 0.9 | 84.0 | 58.0 |

[1] All leach filtrates were combined for analysis.
[2] The mixture used was $NO_2$ to which was added 30% $SO_2$ by volume.

The data in Tables I and II clearly show how effective the present $NO_2$/roast medium leach process is for recovering metal values from sulfide metal minerals. In Table I, Runs 3–5 and 9–13 show that when using commercial grade $NO_2$ as a roast gas, by maintaining roast temperatures above about 550°C. the copper can be effectively extracted from chalcopyrite concentrate while holding the iron extract to below about 20%. Run 15 also indicates that pretreatment of the mineral charge with nitrogen can reduce leachable iron. Runs 17–22 show that mixtures of $NO_2$ and other gases are effective roast gases; copper extraction is high and iron extraction is consistently below 10%. This ability to extract copper selectively is important since (1) in chalcopyrite, copper is the more valuable of the two metals, and (2) recovery of copper from solutions containing a substantial amount of iron (over about 20%) is very difficult.

Table II data shows that the present roast/leach process is effective with sulfide mineral mixtures other than chalcopyrite. Again, the data in Table II shows that the percent iron extracted is very low.

Analogous results can be obtained when an ore or pure mineral is subjected to the present process. In other words, the metal source need not be an ore concentrate as illustrated by the example runs.

The procedure illustrated by the example runs in Tables I and II was a batch procedure. However, the present roast/leach process can also be carried out as a semi-continuous or continuous process.

Metals from other metal sulfide minerals (of the type disclosed above) and ores or concentrates can be recovered in comparable yields using a process of the type described herein.

The leach medium utilized in the examples was a sulfuric acid solution. Water or other aqueous solutions of water mineral acids can also be used; for example, 1% HCl, 0.5% $H_2SO_4$, 2% HBr, 3% $HNO_3$, 15% $H_3PO_4$, and the like. It is preferable to use a weak sulfuric acid solution to leach.

Any convenient temperature can be used for the leach step. Generally, a temperature above room temperature is utilized. If the leach is carried out at atmospheric pressure, then the maximun leach temperature would be at or just below the boiling point of the aqueous medium used; and if temperature higher than the aqueous medium boiling is to be utilized, then the leach can be carried out under pressure.

The present process also offers the possibility of an integral system in which the oxidizing gas can be recycled and discharge of air pollutants is minimized. FIG. 1 is a schematic illustration of such a system. The sulfide mineral is treated with the $NO_2$ containing gas in the roast. The exhaust gas from this roast containing NO, $NO_2$, and $SO_3$ is then sent to a condensor where $SO_3$ is removed. The $NO/NO_2$ from the condensor is then treated with air or oxygen converting the NO to $NO_2$ — this is returned for use in the roast. The roasted mineral is subjected to aqueous leach — the leached residue is separated, for example, by filtration — the filtrate which contains the metals from the mineral, as sulfates, is then sent to metal recovery.

Claims to the invention follow.

We claim:

1. A process for preparing metal sulfate from sulfide metal mineral which comprises
    1. treating said sulfide mineral with nitrogen dioxide containing gas having at least 1% $NO_2$ at a temperature of from about 350°C. to about 750°C.,
    2. leaching the treated sulfide mineral with an aqueous medium, selected from the class consisting of water and aqueous mineral acid of up to 30% acid, and
    3. separating liquid from the solids obtained in the step (2) leaching, whereby metal value contained in said mineral is obtained as a metal sulfate solution.

2. The process of claim 1 wherein said metal value is selected from copper, iron, nickel, lead, zinc, molybdenum, cobalt, silver, manganese value, and mixtures thereof.

3. The process of claim 1 wherein said metal value is copper.

4. The process of claim 3 wherein said mineral is predominantly chalcopyrite.

5. The process of claim 1 wherein said nitrogen dioxide containing gas is nitrogen dioxide.

6. The process of claim 1 wherein said step (1) is carried out at temperatures of about 400°C. to about 650°C.

7. The process of claim 6 wherein said metal value is copper and said mineral is predominantly chalcopyrite.

8. The process of claim 7 wherein said nitrogen dioxide containing gas is nitrogen dioxide.

9. The process of claim 8 wherein said step (1) is carried out at about 500°C.

10. The process of claim 1 wherein said mineral is an ore concentrate.

11. The process of claim 10 wherein said metal value is copper and said concentrate is predominantly chalcopyrite.

12. The process of claim 11 wherein said step (1) is carried out at temperatures of about 500°C. to about 650°C.

13. The process of claim 12 wherein said nitrogen dioxide containing gas is nitrogen dioxide.

14. The process of claim 10 wherein said concentrate contains (1) as principal minerals chalcopyrite, cubanite, pyrrhotite, pentlandite and pyrite, and (2) minor amount of cobalt mineral.

15. The process of claim 14 wherein said nitrogen containing gas is nitrogen dioxide.

16. The process of claim 15 wherein said nitrogen containing gas is a mixture containing from about 50% to about 90% by volume nitrogen dioxide and about 50% to about 10% by volume sulfur dioxide.

17. The process of claim 15 wherein said step (1) is carried out at temperatures from about 600°C. to about 700°C.

18. The process of claim 16 wherein said step (1) is carried out at temperatures from about 600°C. to about 700°C.

19. The process of claim 17 wherein said mixture contains about 77% by volume nitrogen dioxide and about 23% by volume sulfur dioxide.

20. The process of claim 1 wherein said nitrogen dioxide containing gas is a mixture containing from about 50% to about 90% by volume nitrogen dioxide and from about 50% to about 10% sulfur dioxide.

* * * * *